(12) United States Patent
Rytivaara et al.

(10) Patent No.: US 7,092,742 B2
(45) Date of Patent: Aug. 15, 2006

(54) TERMINAL AND METHOD FOR CONTROLLING DISPLAY IN TERMINAL

(75) Inventors: Markku Rytivaara, Oulu (FI); Mika P. Mustonen, Ii (FI)

(73) Assignee: Nokia Corporation, Espoo (FI)

( * ) Notice: Subject to any disclaimer, the term of this patent is extended or adjusted under 35 U.S.C. 154(b) by 157 days.

(21) Appl. No.: 10/699,357

(22) Filed: Oct. 30, 2003

(65) Prior Publication Data

US 2004/0116158 A1 Jun. 17, 2004

(30) Foreign Application Priority Data

Oct. 31, 2002 (FI) ................................ 20021937

(51) Int. Cl.
*H04M 1/00* (2006.01)
(52) U.S. Cl. .................... 455/566; 455/414.1; 455/418
(58) Field of Classification Search ................ 455/566, 455/403, 407, 412.1, 414.1, 418, 514, 556.1, 455/558, 145, 158.4
See application file for complete search history.

(56) References Cited

U.S. PATENT DOCUMENTS

| | | | |
|---|---|---|---|
| 2002/0069078 A1* | 6/2002 | Goldstein | 705/1 |
| 2002/0123368 A1* | 9/2002 | Yamadera et al. | 455/556 |
| 2003/0064757 A1* | 4/2003 | Yamadera et al. | 455/566 |
| 2004/0203674 A1* | 10/2004 | Shi et al. | 455/414.1 |

FOREIGN PATENT DOCUMENTS

| | | |
|---|---|---|
| EP | 1030506 | 8/2000 |
| GB | 2 371 448 A | 7/2002 |
| GB | 2 373 977 A | 10/2002 |

* cited by examiner

*Primary Examiner*—CongVan Tran
(74) *Attorney, Agent, or Firm*—Hollingsworth & Funk, LLC

(57) ABSTRACT

A method for controlling a display in a terminal and to a terminal comprising means for having a bi-directional connection with a telecommunication network and a graphic display. The terminal is arranged to change the properties of a wallpaper shown on the display in response to the remaining amount of pre-paid telecommunication costs.

16 Claims, 3 Drawing Sheets

TERMINAL AND METHOD FOR CONTROLLING DISPLAY IN TERMINAL

FIELD

Figure 1:
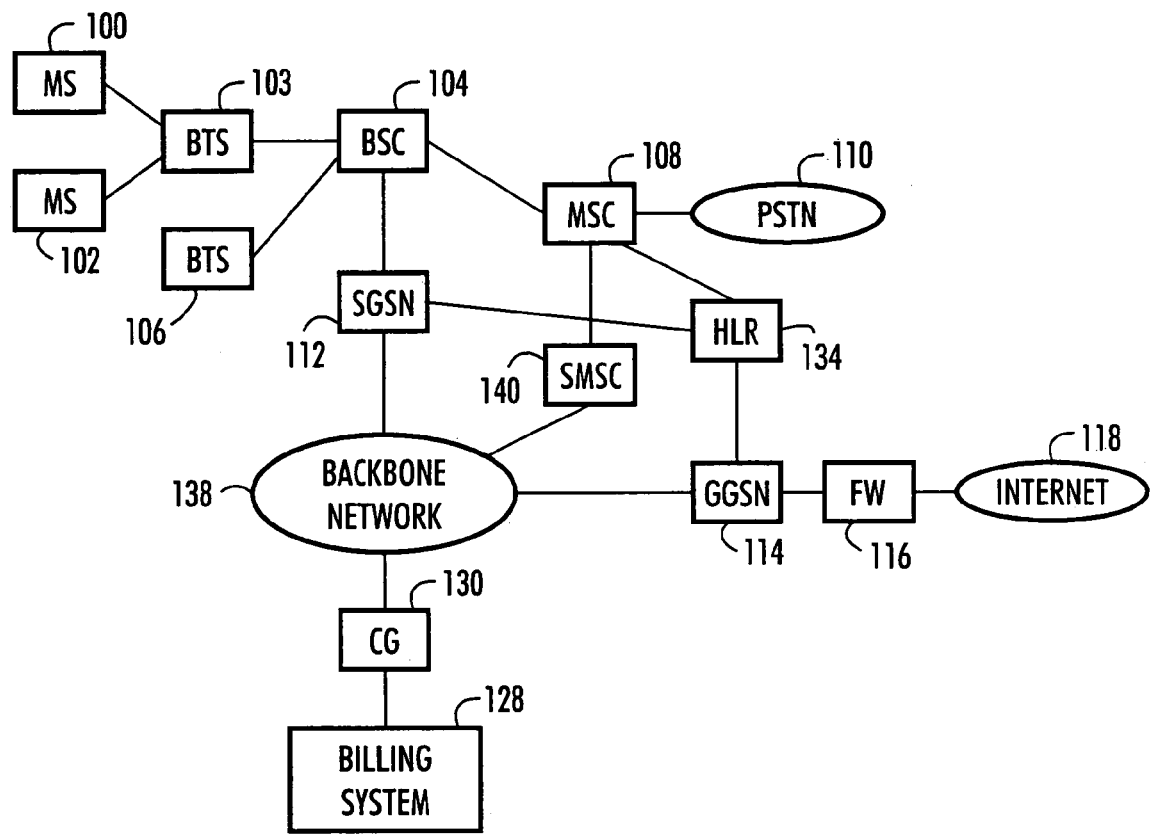

The invention relates to a terminal and a method for controlling a display in the terminal, which communicates with a telecommunication network. In particular, the invention relates to terminals, which include a certain amount of prepaid telecommunication time.

BACKGROUND

In a plurality of telecommunication systems, the user is charged for the telecommunication capacity used. This occurs particularly in wireless telecommunication networks. Two types of charging methods are generally employed. In the first method, the user is charged afterwards for the capacity used at a particular time. In the second method, the user pays a particular sum in advance, by which the user acquires a particular telecommunication capacity for use, for example a certain amount of telecommunication time. The latter method has constantly increased in popularity, as it provides certain advantages. Possibly immense bills do not take the user by surprise afterwards, since the sum is paid in advance. In addition, the user may hand the terminal over to someone else knowing the maximum amount of expenses in advance. Such subscriber connections comprising prepaid airtime are often referred to as prepaid subscriber connections.

Solutions are presented in the prior art that allow the user to check how much prepaid airtime remains or how much is already used. In a known solution, the user may call a charge-free number of his/her operator and a voice responder may inform the user about the remaining time. As to the operator, a drawback with this solution is that the limited connection resources of the system are employed. As regards the user, a drawback is that balance information is not automatically obtained.

Publication EP 1030506 shows a solution, in which the remaining airtime is numerically presented on the terminal display.

Publication GB 2371448 discloses a solution, in which the remaining airtime is shown as a graphical bar on the terminal display.

At present, many terminals show various icons, which operate as such as a user interface of the terminal. The size of the display in portable devices is limited. A disadvantage associated with prior art solutions is the space they take up on the display.

BRIEF DESCRIPTION

It is an object of the invention to provide a terminal and a method for controlling a terminal display to avoid previous drawbacks. This is achieved with a method for controlling a display in a terminal communicating with a telecommunication network. In the method of the invention, the properties of a wallpaper on the display are changed in response to the remaining amount of prepaid telecommunication costs.

The invention also relates to a terminal comprising means for having a bi-directional connection with a telecommunication network and a graphic display. The terminal of the invention is arranged to change the properties of a wallpaper shown on the display in response to the remaining amount of prepaid telecommunication costs.

The method and system of the invention provide several advantages. In an embodiment of the invention, the wallpaper shown on the terminal display presents a portion proportional to the amount of telecommunication costs spent and hides a portion proportional to the amount of remaining telecommunication costs. Thus, such an advantage is achieved that the user only needs a glance to be aware of how much airtime he/she has spent and how much time remains. The information is constantly available for the user, not behind a pushbutton combination or an icon. Then again, the display is not loaded with separate graphic bars or numerical values, which take up space from the icons required when using the apparatus.

LIST OF DRAWINGS

Figure 2:
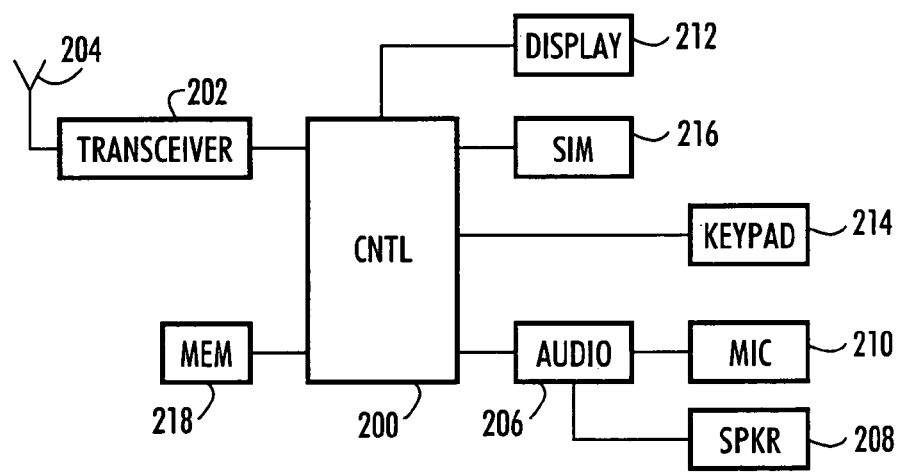
Figure 3:
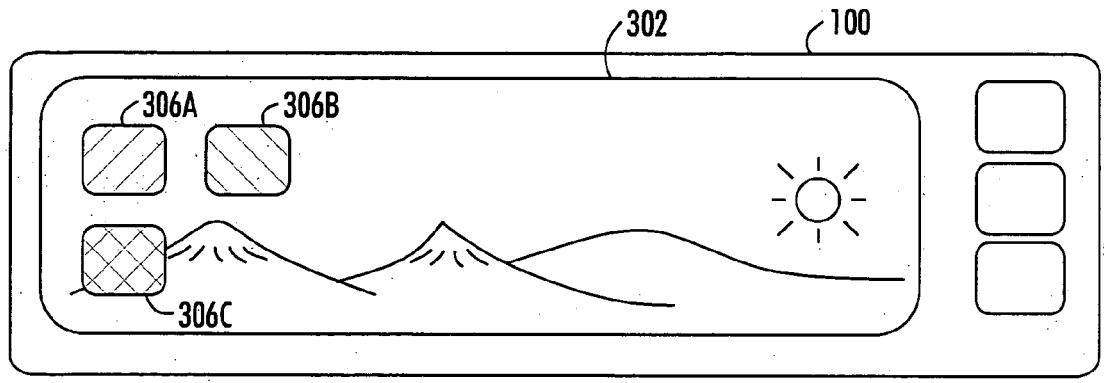
Figure 4:
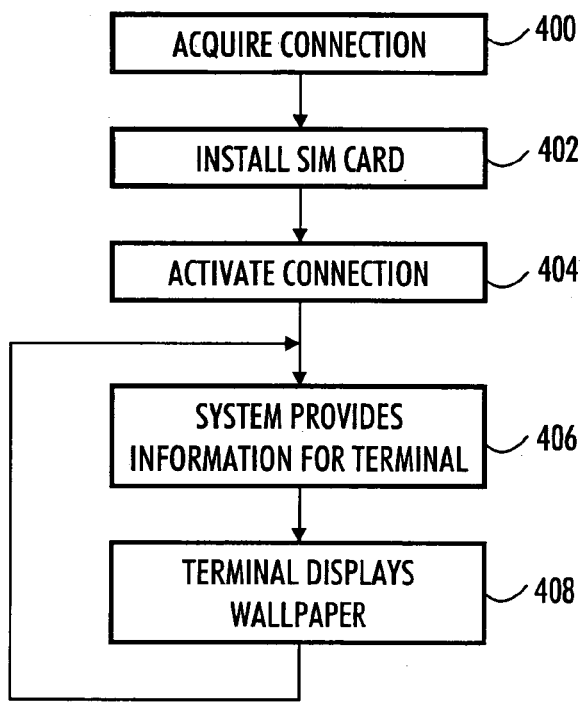
Figure 5A:
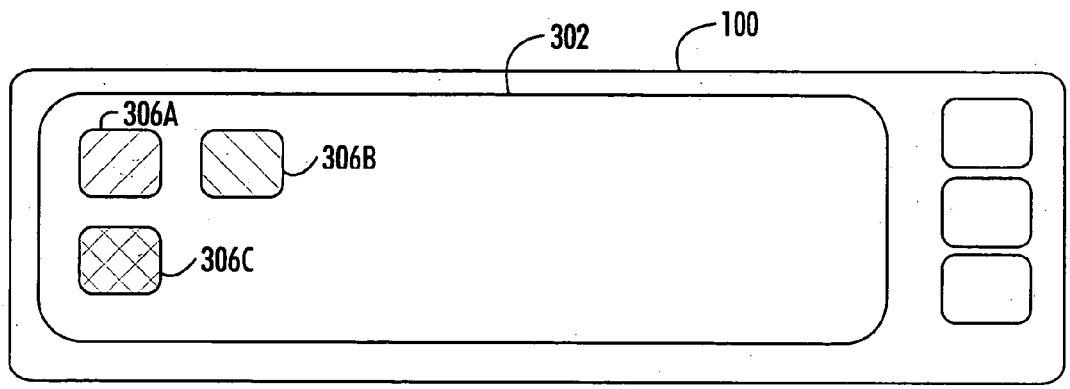
Figure 5B:
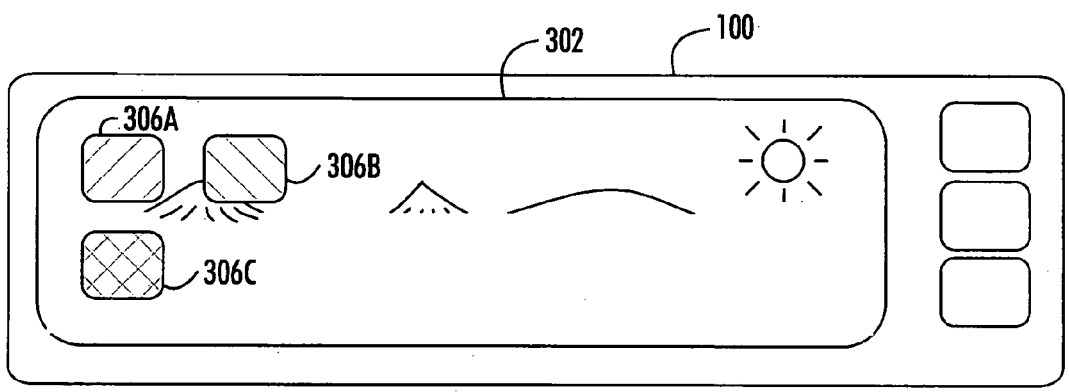
Figure 5C:
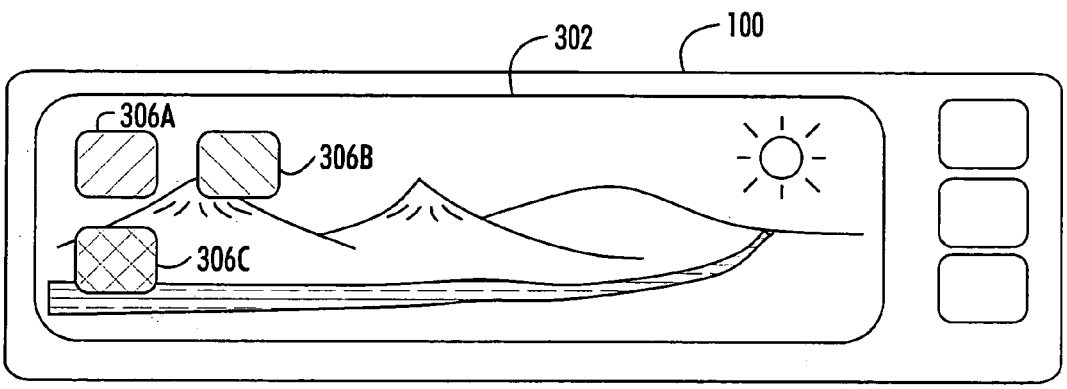

In the following the invention will be described in greater detail by means of the preferred embodiments, in which FIG. 1 illustrates an example of a telecommunication system, FIG. 2 illustrates the structure of a terminal, FIG. 3 shows an example of a display, FIG. 4 shows an example of an embodiment, and FIG. 5 shows another example of the display.

DESCRIPTION OF THE EMBODIMENTS

Let us next take a closer look at an example of a data transmission system with reference to FIG. 1, in which terminals according to the preferred embodiments can be applied. FIG. 1 illustrates the structure of a GSM/GPRS (General Packet Radio Service) system. The main parts of the UMTS system (Universal Mobile Telecommunications System) are also essentially similar to those of the system disclosed herein. A terminal 100 to 102 communicates with a Base Transceiver Station (BTS) 103, which in turn communicates with a Base Station Controller (BSC) 104. The base station controller is typically connected to several base stations 103, 106. The base station controller 104 and the base stations 103, 106 form a Base Station Subsystem (BSS) 160. The base station controller 104 controls the base station 103, 106. What is generally aimed at is to locate the devices that implement the radio path, together with the functionalities associated therewith, at the base station 103, 106, and the control devices at the base station controller 104.

The base station controller 104 handles, for example, the management of the radio resources of the base station 103, 106, inter-cell handover operations, frequency management, i.e. allocation of frequencies to the base stations 103, 106.

The base station 103, 106 comprises at least one transceiver implementing one carrier, i.e. eight time slots or eight physical channels. One base station typically serves one cell. The base station 103, 106 maintains a radio connection to the terminal.

In circuit-switched connections, the base station controller 104 is connected to a Mobile Services Switching Centre (MSC) 108. The mobile services switching centre 108 is the centre of the circuit-switched side. The mobile services switching centre 108 is responsible, for example, for providing circuit-switched connections to a public switched telephone network PSTN 110.

In packet-switched connections, a connection is provided from the base station controller to a Serving GPRS Support Node (SGSN) 112, which is the centre of the packet-switched side. The main function of the serving node 112 is to send packets to and receive packets from a terminal 100, 102 supporting packet-switched transmission. The serving node 112 comprises subscriber and location information relating to the terminals 100, 102.

The GPRS network may also comprise a Gateway GPRS Support Node (GGSN) 114. The gateway node 114 is responsible for routing outgoing traffic, possibly through a firewall 116, from the backbone network to external networks, such as the Internet 118.

The data transmission system comprises a billing system 128 that carries out billing and communicates with the network over a Billing Gateway (BG) 130. The billing system also attends to the accounts of prepaid subscriber connections, i.e. monitors how the prepaid airtime is used. This operation can also be implemented elsewhere in the network, for example, using a separate server.

A Home Location Register (HLR) 134 comprises a database on the subscribers of the system, i.e. a permanent subscriber register.

The system also comprises a Short Message Service Centre (SMSC) 140, which transmits short messages between the network and the terminals.

The GPRS backbone network 138 is typically implemented as a network based on the Internet protocol (IP), where data packets are transferred between different GPRS network elements.

With reference to FIG. 2, an example showing a terminal will next be examined. The terminal comprises a control unit 200, which controls the operation of the entire apparatus. The control unit is typically a processor including software, but it can also be implemented using separate components. The terminal comprises transceiver parts 202, by means of which a connection is established and updated to the telecommunication system through an antenna 204. When a speech connection is concerned, the control unit conveys a signal received by transceiver parts 202 to audio parts 206, in which the required decoding is carried out, as well as the conversion into analogue mode, and the signal is conveyed into an earphone 208. The user's speech is conveyed from a microphone 210 to audio parts, in which speech is converted into digital mode and coded, and conveyed to the transceiver by means of the control unit. The user interface of the apparatus also comprises a display 212 and a keyboard 214.

The terminal further comprises a Subscriber Identification Module (SIM) 216, which includes the subscriber connection data of the user. The SIM card can be detached and changed from the card module.

In modern terminals, the display 212 is able to show graphics, either in black-and-white or in colour. Thus, in some terminals, what is known as a wallpaper can be shown on the display, in the same fashion as graphical user interfaces of computers. The wallpaper is constantly shown on the display, and other objects presented on the display, such as icons and open documents, are shown on the wallpaper. FIG. 3 illustrates an example of the wallpaper. The Figure shows a terminal 100 comprising a display 302. The display includes a wallpaper 304, and a number of icons 306A to 306C are shown on the wallpaper that allow the user to start programs and functions of the terminal.

Let us next take a closer look at a preferred embodiment associated with prepaid subscriber connections. Here, reference is made to the block diagram shown in FIG. 4 and to the previous system and terminal figures. When a user acquires a telephone subscription, he/she obtains a SIM card comprising the data of the subscription to be mounted into the terminal. When the card is mounted into the terminal, the system identifies the subscription based on the data of the SIM card. When the user acquires a prepaid subscriber connection, he/she also orders a certain arranged amount of telecommunication capacity, for instance airtime for speech connections or the right to transfer a particular amount of data for GPRS packet connections. In a preferred embodiment of the invention, a wallpaper is previously stored into each SIM card that can be viewed on the terminal display.

In step 400, a prepaid subscriber connection is acquired as well as a SIM card associated therewith. In a preferred embodiment of the invention, the wallpaper associated with the SIM card is from a desired field previously selected by the user. In such a case, the user may previously select the desired field for the wallpaper in the SIM card. Examples of particular fields include cars, landscapes, sports, horses etc.

In step 402, the user places the SIM card into the terminal and switches on the apparatus.

In step 404, the subscriber connection is activated. When the terminal 100 detects the newly mounted SIM card, it sends a message to the system through the base station 103. The home register 134 is determined when the subscriber connection is activated and the billing data will be activated in a billing system 128.

In step 406, the billing system 128 provides the terminal 100 with information about the situation in relation to the prepaid subscriber connection capacity. Such information can be sent in various ways, for instance as a data call or a Smart messaging message. The information may comprise, for instance, data concerning how much time is spent and how much still remains.

In step 408, the terminal 100 receives the information, reads the wallpaper from the SIM card and shows the wallpaper on the terminal display. The terminal controls the properties of the wallpaper based on the information obtained. From here, the process returns to step 306, in which the system again indicates the connection capacity. In a preferred embodiment, the system provides the terminal with information always when the information changes, i.e. for example after a completed call. In another alternative, information is provided at regular intervals. The information can also be indicated in other ways, as is obvious for those skilled in the art.

In a preferred embodiment of the invention, the wallpaper shows a portion that is proportional to the amount of telecommunication costs spent and hides the portion that is proportional to the amount of remaining telecommunication costs. Consequently, the wallpaper is not shown at all when the subscriber connection is activated. When the prepaid telecommunication costs are completely unused, the wallpaper is entirely hidden and when the telecommunication costs are totally used up the wallpaper is visible in full. Then the display 302 of terminal 100 may for example be like the one shown in FIG. 5A. The icons 306A to 306C are visible on the display but the wallpaper cannot yet be seen at all.

Always when the system provides information concerning the used and remaining connection capacity, the terminal changes the settings of the wallpaper. For example in a step, in which half of the prepaid capacity is used, the display 302 may be in accordance with FIG. 5B, in which the wallpaper is partly visible. Correspondingly, when the prepaid capacity is totally used, the display may resemble the one shown in FIG. 5C, in which the wallpaper is visible in full.

In another embodiment of the invention, the wallpaper shows a portion that is proportional to the remaining amount of telecommunication costs can and hides the portion that is proportional to the amount of telecommunication costs spent.

Here, an alternative is shown, in which the wallpaper is linearly revealed starting from the top. This is naturally only an example. The wallpaper may also be revealed in other ways, for instance partly like a jigsaw, starting from one end or from the middle and proceeding towards the ends.

In an embodiment of the invention, the terminal may store the wallpaper read from the SIM card in a memory 218 thereof, whereby the picture on the display is loaded slightly faster when starting the apparatus. Another alternative is to store the picture only on the SIM card.

In a preferred embodiment of the invention, the method/apparatus is such that the telecommunication network controls the display of the wallpaper. Thus, the system does not provide the terminal with information about the used or remaining airtime, only information about how the wallpaper should be displayed on the display.

Since several types of terminals exist, and the size and properties of their displays vary, the wallpaper on the SIM card is scaled to suit each display type in a preferred embodiment of the invention. This can be carried out by software when activating the subscriber connection, or alternatively the SIM card may comprise several versions of the same picture, among which the most appropriate one is selected for the display type of the terminal concerned in connection with activation.

In a preferred embodiment of the invention, when the prepaid airtime is ending and when the wallpaper is fully visible, the system may inform the user that the prepaid time is about to end, for instance, using a short message or in another similar way. In an alternative, the terminal is arranged to ask the user, whether the wallpaper should still be visible, whether the user wants to forward the picture to another subscriber connection or whether the image should be removed.

In an embodiment, when the airtime has ended, the terminal is arranged to gradually change the properties of the wallpaper, for example, so that the wallpaper gradually fades or dims, if no more airtime is ordered from the operator.

Even though the invention has above been explained with reference to an example according to the accompanying drawings, it is obvious that the invention is not restricted thereto, but can be modified in various ways within the scope of the appended claims. For instance, prepaid airtime can be ordered from the operator also by phone, in which case the operator may provide the terminal with the wallpaper using a short message.

The invention claimed is:

1. A method for controlling a display in a terminal communicating with a telecommunication network, the method comprising
    displaying a wallpaper on the display,
    changing properties of a wallpaper on the display in response to the remaining amount of prepaid telecommunication costs.

2. A method as claimed in claim 1, further comprising showing a portion of the wallpaper proportional to the amount of telecommunication costs spent and hiding a portion proportional to the amount of remaining telecommunication costs.

3. A method as claimed in claim 2, further comprising hiding the wallpaper entirely when the prepaid telecommunication costs are completely unused, and showing the wallpaper in full when the prepaid telecommunication costs are totally used up.

4. A method as claimed in claim 1, further comprising showing a portion of the wallpaper proportional to the amount of telecommunication costs remaining and hiding a portion proportional to the amount of remaining telecommunication spent.

5. A method as claimed in claim 1, wherein the wallpaper originates from a field that the user has desired.

6. A method as claimed in claim 1, wherein the telecommunication network controls the wallpaper display.

7. A method as claimed in claim 1, wherein the telecommunication network provides information about the telecommunication costs spent.

8. A method as claimed in claim 1, further comprising storing the wallpaper into a memory of the terminal when prepaid telecommunication costs are used for the first time.

9. A method as claimed in claim 1, further comprising reading the wallpaper from a SIM card.

10. A method as claimed in claim 1, further comprising sending the wallpaper to the terminal using a short message.

11. A terminal comprising means for having a bi-directional connection with a telecommunication network and a graphic display, the graphic display being arranged to display a wallpaper, wherein the terminal is arranged to change the properties of a wallpaper shown on a display in response to the remaining amount of prepaid telecommunication costs.

12. A terminal as claimed in claim 11, wherein the terminal is arranged to receive information from the telecommunication network about the remaining prepaid telecommunication costs and to change the properties of the wallpaper based on the information received.

13. A terminal as claimed in claim 11, wherein the terminal comprises means for reading the SIM card and means for reading the wallpaper stored in the subscriber card.

14. A terminal as claimed in claim 11, wherein the terminal is arranged to show from the wallpaper a portion proportional to the amount of telecommunication costs spent and to hide a portion proportional to the amount of remaining telecommunication costs.

15. A method for controlling a display in a terminal communicating with a telecommunication network, the method comprising
    displaying graphics on the display, and other information on top of the graphics,
    receiving information relating to the remaining amount of prepaid telecommunication costs, and
    changing the amount of the graphics visible on the display in response to the received information.

16. A terminal comprising:
    a graphic display;
    means for having a bi-directional connection with a telecommunication network;
    means for displaying graphics on the display, and other information on top of the graphics;
    means for receiving information relating to the remaining amount of prepaid telecommunication costs; and
    means for changing the amount of the graphics visible on the display in response to the received information.

* * * * *